United States Patent [19]

Whitcroft

[11] 4,157,846
[45] Jun. 12, 1979

[54] MOTOR VEHICLE HAVING A SLIDING DOOR ASSEMBLY

[75] Inventor: Alan J. Whitcroft, Barton-le-Clay, England

[73] Assignee: General Motors Corporation, Detroit, Mich.

[21] Appl. No.: 845,568

[22] Filed: Oct. 26, 1977

[30] Foreign Application Priority Data

Nov. 26, 1976 [GB] United Kingdom ............... 49406/76

[51] Int. Cl.² ............................................. B60J 5/06
[52] U.S. Cl. ..................................... 296/155; 49/209; 49/213
[58] Field of Search ............... 296/155, 153, 146, 147; 49/213, 214, 221, 209

[56] References Cited

U.S. PATENT DOCUMENTS

| | | | |
|---|---|---|---|
| 2,819,114 | 1/1958 | Lake | 296/155 |
| 3,594,036 | 7/1971 | Cadiou | 296/155 |

*Primary Examiner*—Richard A. Bertsch
*Attorney, Agent, or Firm*—K. H. MacLean, Jr.

[57] ABSTRACT

A motor vehicle having a sliding door assembly in which a sliding door is movable between an open position wherein said door is suspended parallel to and adjacent a side of said vehicle and a closed position wherein said door fills an opening in said vehicle side and lies flush with said vehicle side.

4 Claims, 6 Drawing Figures

MOTOR VEHICLE HAVING A SLIDING DOOR ASSEMBLY

This invention relates to motor vehicles having sliding doors thereto, and, in particular, relates to a motor vehicle having a sliding door assembly in which a sliding door is movable between a first position wherein said door is suspended parallel to and adjacent a side of said vehicle and a second position wherein said door fills an opening in said vehicle side and lies flush with said vehicle side.

Sliding door assemblies are known which set out to solve the problem of utilizing a sliding door in a vehicle such that, when said door is in a closed position, it lies flush with the surrounding bodywork of the vehicle. These known sliding door assemblies utilize swinging linkages which, on opening the vehicle door, effectively displace the door from its position flush with the vehicle bodywork prior to sliding the door relative to said bodywork along guide tracks situated on the vehicle. The swinging linkages used in sliding door assemblies of this type are necessarily capable of supporting the weight of the door as it is swung from a closed position to its initial open position prior to sliding along the guide tracks. A common feature in these known sliding door assemblies is that one or more swinging linkages are provided at the lower edge of the sliding door to act as both load-bearing supports for the door as well as guide means for the door. To ensure efficient operation of such sliding door assemblies, the guide track for these lower swinging linkages needs to be kept clean and un-distorted in order to produce efficient sliding operation of the door. Since a common feature in said guide track for such assemblies is that the guide track is situated on the floor of the vehicle it is difficult to maintain said guide track clear from any extraneous debris accumulating on the floor of the vehicle.

A motor vehicle according to the invention has a sliding door assembly in which a sliding door is movable, between a first position wherein said door is suspended parallel to and adjacent a side of said vehicle and a second position wherein said door fills an opening in said vehicle side and lies flush with said vehicle side, by three guide means situated respectively at the upper leading edge of the door, the lower leading edge of the door and at a point on the trailing edge of the door intermediate the upper and lower edges thereof, the guide means at the upper leading edge of the door comprising a cranked support arm pivotally mounted at one end on a support bracket secured to the door adjacent the upper leading edge thereof, said support arm being movable relative to said door about a vertical axis extending through said support bracket, the other end of the support arm carrying thereon firstly a rotatable guide roller having an axis of rotation parallel to the pivot axis of the support arm, and secondly a movable secondary support arm which is pivotally connected at one end thereof to said other end of the support arm so as to pivot about an axis parallel to the pivot axis of the support arm, there being mounted on the other end of said secondary support arm a rotatable load-bearing support roller which is rotatable about an axis at right angles to the pivot axis of the support arm and has a grooved periphery thereof engaged with a support track located inside the vehicle adjacent the upper edge of said opening in the vehicle side and extending at least the width of said opening, the rotatable guide roller being movably retained within a guide track located inside the vehicle and above said support track, which guide track extends at a converging angle to said support track for at least the width of said opening so that, as the sliding door is moved from said first position to said second position, the movement of the guide roller and support roller in the respective tracks therefor causes the upper leading edge of the door to move into sealing engagement with a corresponding upper edge of said opening.

Advantageously, the guide means situated at the trailing edge of the door is also a load-bearing support means for the door, and is described hereinafter in a preferred embodiment of the invention.

Preferably the guide means situated at the trailing edge of the door comprises a cranked arm pivoted at one end to the door about a substantially vertical axis, the other end of said arm carrying at least two guide rollers movably mounted thereon, which rollers are retained and engaged in a track extending along the side of the vehicle, said track terminating in a horizontally disposed hooked portion extending towards the interior of the vehicle adjacent said opening so that, as the sliding door is moved from said first position to said second position, the guide rollers move along said track and around said portion thereof and cause the trailing edge of said door to sealingly engage the corresponding edge of said opening.

In the preferred embodiment of the invention described hereinafter, the guide means situated at the lower leading edge of the door comprises an arm secured to, and extending inwardly of the vehicle from, the lower leading edge of the door, said arm terminating in a movably mounted roller movably retained within a curved channel-shaped guide track extending beneath a floor portion of the vehicle, the curve of the guide track being such that the lower leading edge of the door is sealingly engaged with a corresponding portion of said opening when said door is moved into said second position.

The object and advantages of the present invention will be apparent from the following detailed description wherein the preferred embodiment of the invention will now be described with reference to the accompanying drawings, in which:

Figure 1:
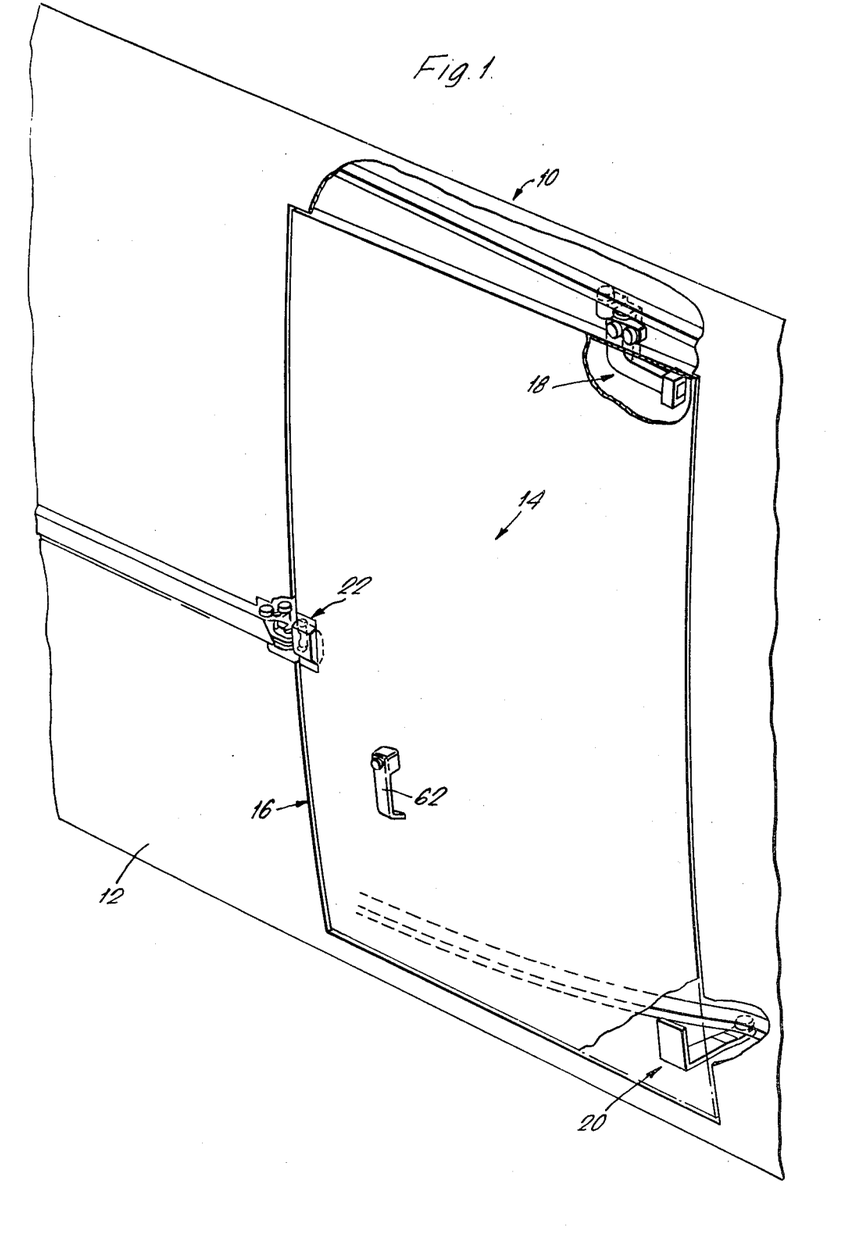
FIG. 1 shows a partial side view, with parts broken away, of a side of a motor vehicle according to the invention.

Referring now to FIG. 1, a side 12 of a motor vehicle 10 has a sliding door 14 which, in the closed position, occupies a substantially rectangular opening 16 in the side of the vehicle and lies flush with said side of the vehicle. There are three guide means provided for the door 14, these being an upper guide means 18 provided at the upper leading edge of the door, a lower guide means 20 provided at the lower leading edge of the door, and a trailing guide means 22 provided at a point on the trailing edge of the door intermediate the upper and lower edges thereof.

Figure 2:
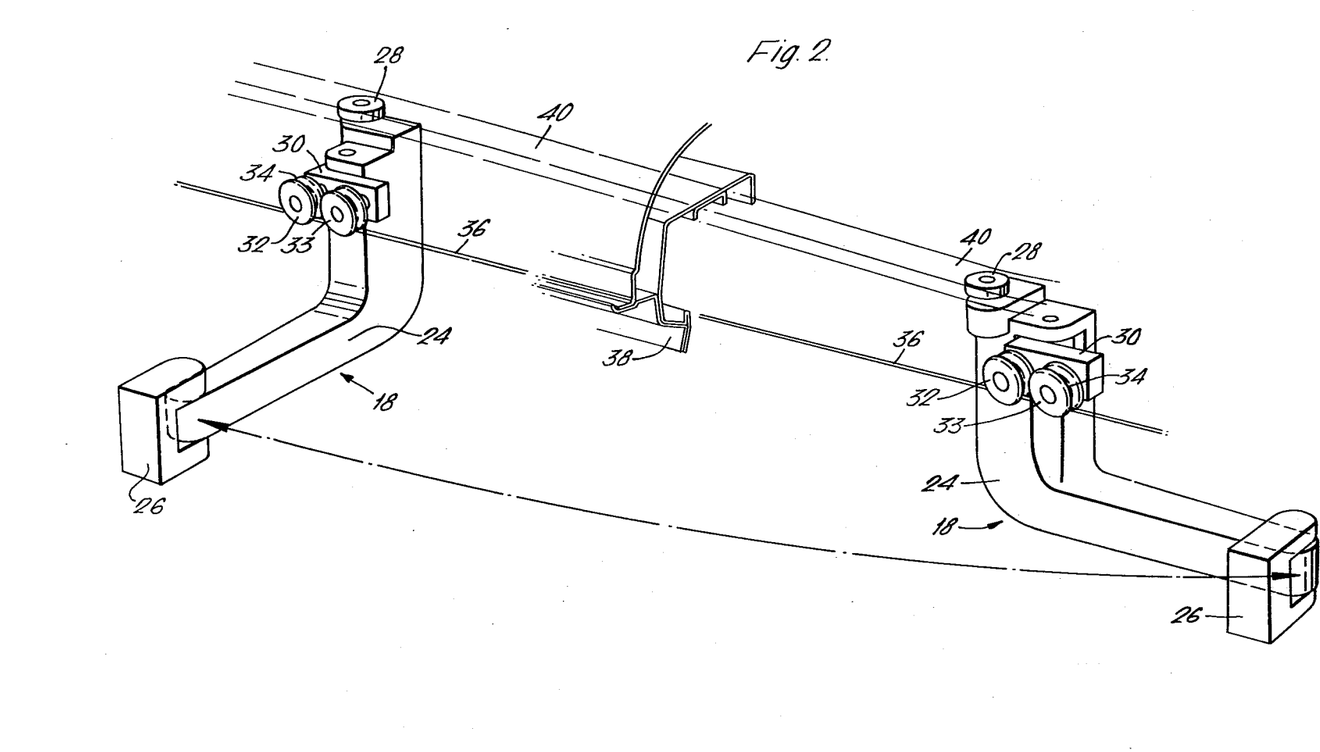
FIG. 2 shows a detailed view of a portion of FIG. 1.

The upper guide means 18 is shown in detail in FIG. 2 of the drawings in two positions, the left hand position corresponding to the position of the upper guide means 18 when the sliding door 14 is in a fully opened position, and the right hand position corresponding to the position of the upper guide means 18 when the sliding door 14 is in a fully closed position within the opening 16. The upper guide means 18 comprises a cranked support arm 24 pivotally mounted at one end on a support bracket 26 secured to the door 14 adjacent the upper leading edge thereof, said support arm 24 being movable relative to said door 14 about a vertical axis extending through said support bracket 26. The other end of the support arm 24 extends upwardly within the interior of the vehicle 10 towards the roof thereof (not shown) and carries thereon a rotatable guide roller 28 having an axis of rotation parallel to the pivot axis of the support arm 24, and, secondly, a movable secondary support arm 30 which is pivotally connected at one end thereof to said other end of the support arm 24 so as to pivot about an axis parallel to the pivot axis of the support arm 24, there being mounted on the other end of said secondary support arm 30 twin rotatable load-bearing support rollers 32, 33 which are rotatable about respective axes at right angles to the pivot axis of the support arm 24. The periphery of each of the rotatable load bearing support rollers 32, 33 has a groove 34 formed therein, which groove engages with an upstanding edge 36 of a support track 38 which is located inside the vehicle 10 adjacent the upper edge of said opening 16 in the vehicle side 12 and extends at least the width of said opening 16. The rotatable guide roller 28 is movably retained within an inverted channel shaped guide track 40 located inside the vehicle 10 and above said support track 38, said guide track 40 extending at a converging angle to said support track 38 for at least the width of the opening 16.

Figure 3:
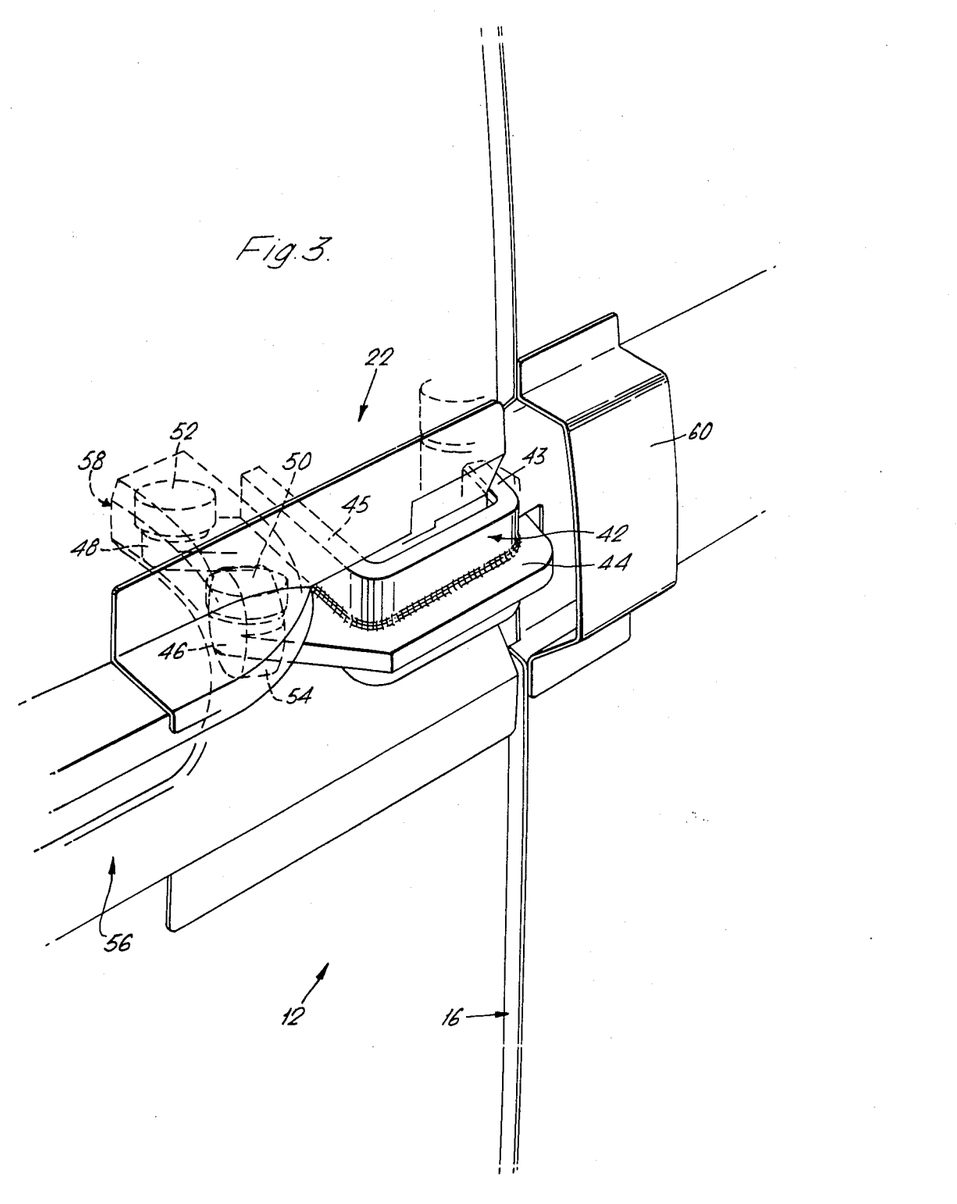
FIG. 3 shows a detailed view of another portion of FIG. 1.

Turning now to FIG. 3 of the drawings, this shows a detailed view of the trailing guide means 22 for the sliding door 14, when the sliding door is in a closed position and is housed within the opening 16 in the side 12 of the vehicle 10. The trailing guide means 22 comprises a substantially horizontal U-shaped cranked arm 42, pivoted at one end of one limb 43 of said U-shaped arm to the door 14 about a substantially vertical axis which extends at right angles to the plane of the arm 42. The other limb 45 of the U-shaped cranked arm 42 extends towards the side 12 of the vehicle 10. Secured to the mid-section of the exterior of the U-shaped cranked arm 42 is a ledge 44 which has, on that portion adjacent the limb 45, two extensions 46 and 48, each of which carries movably mounted thereon a substantially horizontal guide wheel 50, 52. Movably mounted on the ledge 44 in the valley formed between the extensions 46 and 48 is a substantially vertical load-bearing guide roller 54. The horizontal guide rollers 50, 52, and the vertical load-bearing guide roller 54 are movably retained and engaged in a substantially horizontal track 56 which extends along the side 12 of the vehicle 10. This horizontal guide track 56 has a substantially C-shaped cross section, and terminates at the end adjacent the opening 16 in a hooked portion 58 which extends inwardly of the vehicle to a sufficient extent to house the horizontal guide rollers 50, 52 and the vertical load-bearing guide roller 54 within the bodywork of the vehicle when the door 14 is in the closed position. A shroud 60 on the door 14 serves to partially conceal and protect the pivoted end of the U-shaped cranked arm 42.

The application for a force to a door handle 62 (see FIG. 1) to produce an outward movement of the door 14 from the opening 16 causes the U-shaped cranked arm 42 to move about the pivot point of the limb 43 and the horizontal guide rollers 50, 52 and the vertical load-bearing guide roller 54 to move along the hooked portion 58 of the guide track 56 towards the straight portion of said guide track. This swinging movement of the cranked arm 42 results in the trailing edge 64 of the door being lifted clear of the vehicle side 12. This can be seen clearly in FIG. 4 of the drawings. Sliding movement of the door 14 relative to the vehicle side 12 will result in the horizontal guide rollers 50, 52 and the vertical load-bearing roller 54 moving along the horizontal guide track 56, the distance between the limbs 43, 45 of the U-shaped cranked arm 42 being such that the inner portion of the door is retained a predetermined distance from the bodywork of the vehicle side 12. The position of the cranked arm 42 relative to the door 14 during said sliding movement can be seen clearly in FIG. 5 of the drawings.

Figure 6:
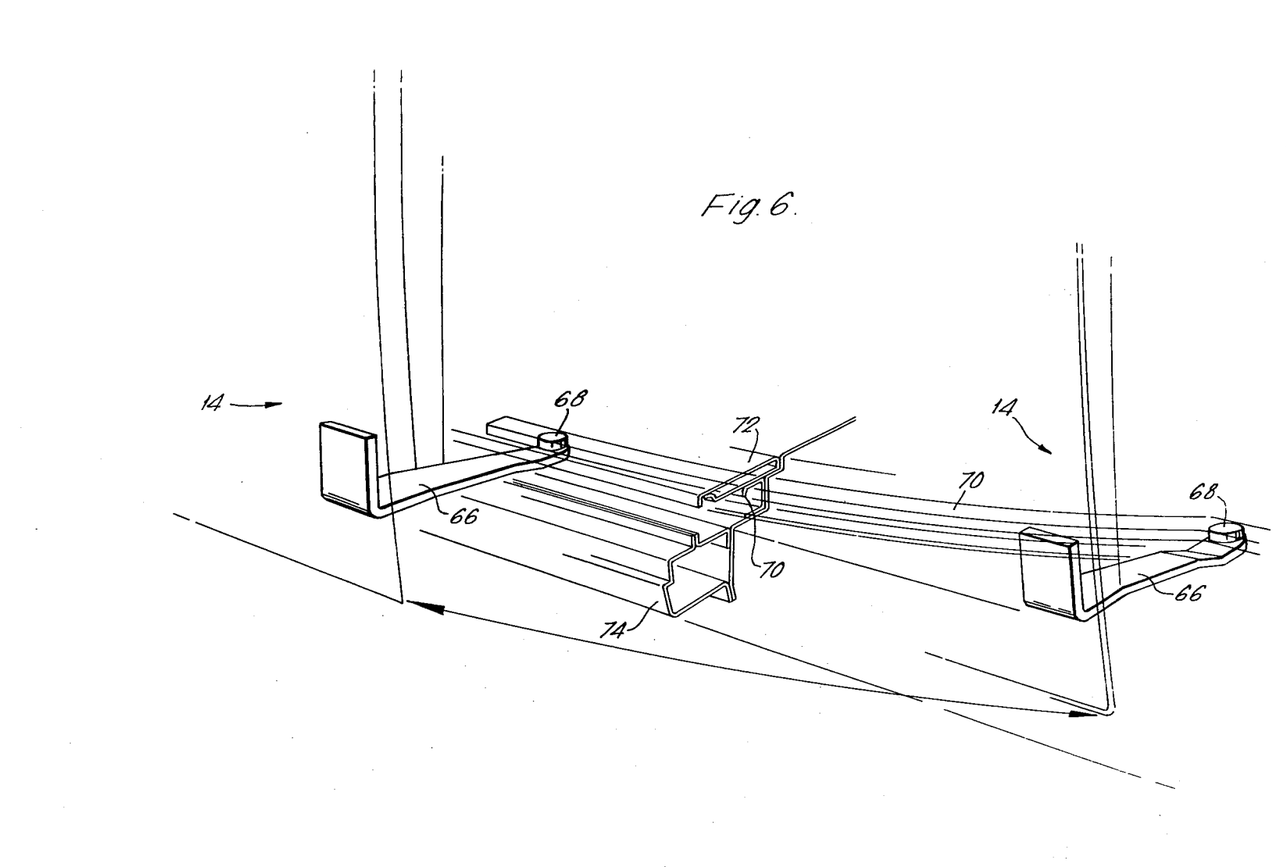
FIG. 6 shows a detailed view of a third portion of FIG. 1.

A detailed view of the lower guide means 20 for the door 14 is shown in FIG. 6 of the drawings, in which the lower guide means is shown in the position it occupies when the door is fully opened on the left hand side of FIG. 6, and in the position it occupies when the door is fully closed on the right hand side of FIG. 6. The lower guide means 20 comprises an arm 66 secured to, and extending inwardly of the vehicle from, the lower leading edge of the door 14, said arm 66 terminating in a movably mounted, substantially horizontal guide roller 68. This guide roller 68 is movably retained within a curved inverted channel-shaped guide track 70 extending horizontally beneath a floor portion 72 of the vehicle 10. The floor portion 72 of the vehicle is secured to a substantially horizontal side rail 74 of the vehicle in such a way as to leave an access gap between said floor portion 72 and said side rail 74 to allow movement of the arm 66 there between. The curvature of the channel-shaped guide track 70 is such that, as the door moves from the position shown on the left hand side of FIG. 6 to the position shown on the right hand side of FIG. 6, the lower leading edge of the door is brought towards the side 12 of the vehicle and then into sealing engagement with a door seal (not shown) surrounding said opening 16.

OPERATION

Figure 4:
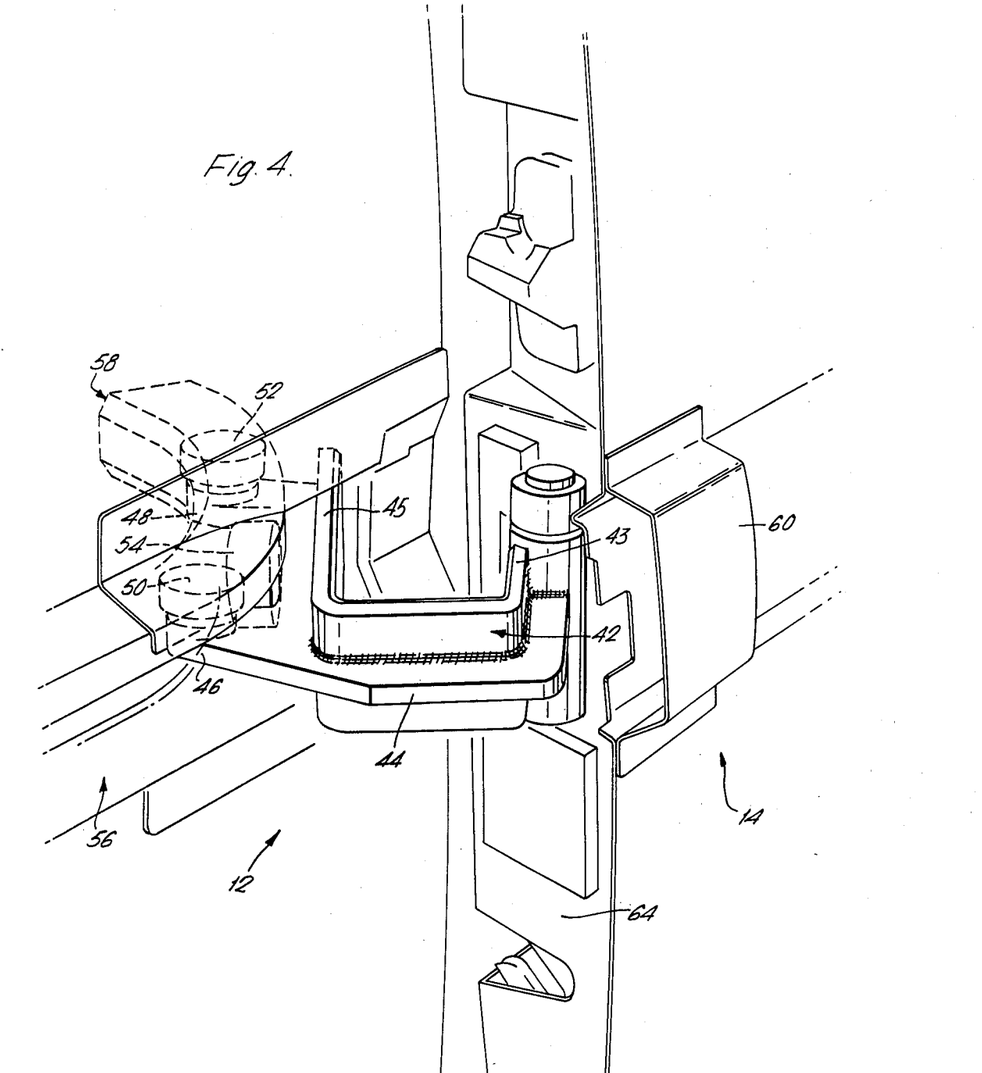
FIG. 4 is similar to FIG. 3 with the vehicle door in an initial, open position.
Figure 5:
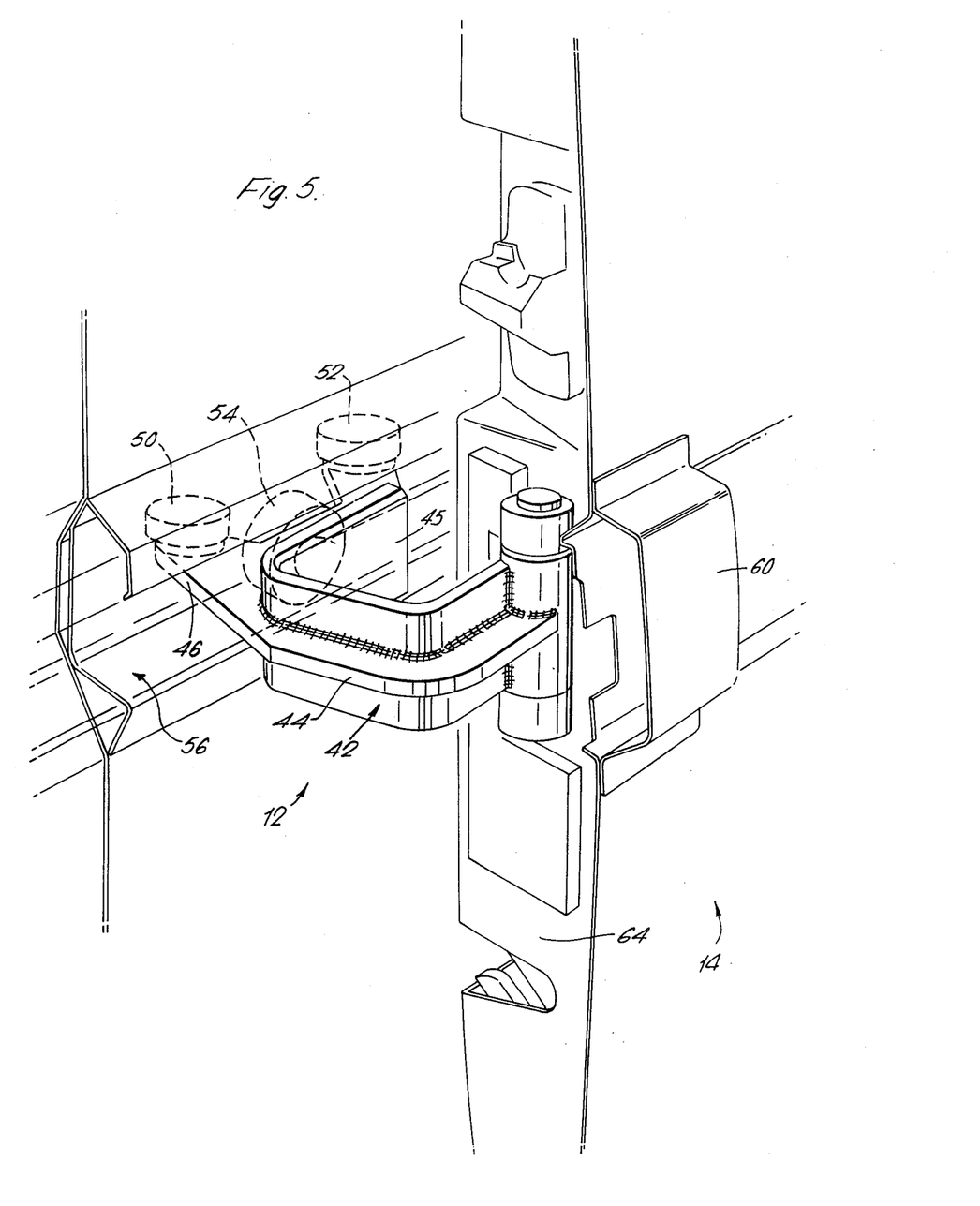
FIG. 5 is a view similar to FIG. 3 with the door in a fully open position.

Consider the door 14 initially in a closed position as shown in FIG. 1 of the drawings. In this position, the door 14 fits in sealing engagement with a door seal surrounding the edges of the substantially rectangular opening 16 in the vehicle side 12. When in this closed position, the door 14 lies substantially flush with the surrounding bodywork of the vehicle 10. The door 14 is retained in the closed position by latch means (not shown) which are operated from the handle 62 on the door 14. To open the door, the handle 62 is grasped, the latch means is released by depressing a release mechanism on the handle 62, and a force is applied to the handle at right angles to the vehicle side 12. This force causes the trailing edge 64 of the door to move outwards of the vehicle side 12 as indicated in FIG. 4 of the drawings, the arm 42 of the trailing guide means 22 pivoting around the pivot point of the limb 43 into the position shown in FIG. 4.

To open the door 14 to its furthest extent, i.e., completely clear of the opening 16, a force is applied on the door handle 62 in a direction parallel to the vehicle side and directed towards the trailing edge 64 of the door 14. This results in the door commencing a sliding movement on the three guide means 18, 20 and 22 during which movement the leading edge of the door is moved outwardly of the vehicle side 12 until the door 14 is held suspended parallel to and adjacent said side 12. Sliding movement of the door continues until the three guide means reach the positions shown respectively on the left hand side of FIG. 2, in FIG. 5 and on the left hand side of FIG. 6.

The required outward movement of the lower leading edge of the door 14 is produced by the lower guide means 20 as a result of the guide roller 68 moving along the curved track 70 as shown in FIG. 6 of the drawings. The pivoting and sliding action of the trailing guide means 22 has already been described and is shown clearly in FIGS. 3, 4 and 5 of the drawings. As regards the upper guide means 18, the operation of this guide means essentially is the pivotal movement of the cranked arm 24 from its position as shown on the right hand side of FIG. 2 to its position as shown on the left hand side of FIG. 2, which pivotal movement occurs as a result of the travel of the guide roller 28 and the support rollers 32, 33 along their respective tracks 40 and 36, these respective tracks being arranged at such an angle to one another that, as the cranked arm 24 moves from the position shown on the right hand side of FIG. 2 to the position shown on the left hand side of FIG. 2, it is caused to pivot about the axes of rotation of the guide roller 28 and the secondary support arm 30 until it extends substantially at right angles to the plane of the door. Since the support track 36 extends parallel to the opening 16 in the vehicle side 12 the net effect of this pivoting movement of the cranked arm 24 is to displace the upper leading edge of the door 14 away from the vehicle side 12. By using such a swinging link mechanism on a pair of coverging tracks for the upper guide means, it is possible to achieve the desired motion of the upper edge of the door without the need to encroach unduly upon the roof space available adjacent said door opening 16.

Thus the present invention provides a motor vehicle having a sliding door assembly in which a sliding door is movable between a first position wherein said door is suspended parallel to and adjacent a side of said vehicle and a second position wherein said door fills an opening in said vehicle side and lies flush with said vehicle side by utilizing three guide means situated at predetermined points on the sliding door, the upper guide means being both a guide means and a suspension means for the door and having a system of converging guide tracks which enables the upper edge of the door to operate in the desired fashion without requiring undue intrusion of the guide tracks into the roof space of the vehicle.

What is claimed is as follows:

1. A motor vehicle having a sliding door assembly including a sliding door and three separate guide means for said sliding door, said sliding door being movable on said three guide means between a first position wherein said sliding door is held suspended parallel to and adjacent a side of said vehicle and a second position wherein said sliding door fills an opening defined in said vehicle side and lies flush with said vehicle side; the first of said guide means being situated at the upper leading edge of the sliding door, the second of said guide means being situated at the lower leading edge of the sliding door, and the third of said guide means being situated at a point on the trailing edge of the sliding door intermediate the upper and lower edges thereof; said first guide means comprising: a support bracket secured to the sliding door adjacent the upper leading edge thereof; a cranked support arm pivotally mounted at one end to said support bracket and movable relative to said sliding door about a vertical axis extending through said support bracket; a guide roller rotatably mounted on the other end of said support arm and having an axis of rotation parallel to said vertical axis; a movable secondary support arm pivotally connected at one end thereof to said other end of said support arm so as to pivot about an axis parallel to said vertical axis; a load-bearing support roller rotatably mounted on the other end of said secondary support arm and having an axis of rotation at right angles to said vertical axis, said load-bearing support roller having a grooved periphery; a support track secured inside the vehicle adjacent the upper edge of said defined opening in the vehicle side and extending at least the width of said defined opening, said track having an upstanding portion thereof engaged with the grooved periphery of said load-bearing support roller; and a guide track secured inside said vehicle and above said support track, which guide track extends at a converging angle to said support track for at least the width of said defined opening; said rotatable guide roller being movably retained within said guide track so that, as the sliding door is moved from said first position to said second position, the movement of the guide roller and the load-bearing support roller along the respective tracks thereof causes the upper leading edge of the door to move into sealing engagement with a corresponding upper edge of said defined opening.

2. A motor vehicle having a sliding door assembly including a sliding door and three separate guide means for said sliding door, said sliding door being movable on said three guide means between a first position wherein said sliding door is held suspended parallel to and adjacent a side of said vehicle and a second position wherein said sliding door fills an opening defined in said vehicle side and lies flush with said vehicle side; the first of said guide means being a load-bearing support means for said sliding door and being situated at the upper leading edge of the sliding door, the second of said guide means being situated at the lower leading edge of the sliding door, and the third of said guide means being a load-bearing support means for said sliding door and being situated at a point on the trailing edge of the sliding door intermediate the upper and lower edges thereof; said first guide means comprising: a support bracket secured to the sliding door adjacent the upper leading edge thereof; a cranked support arm pivotally mounted at one end to said support bracket and movable relative to said sliding door about a vertical axis extending through said support bracket; a guide roller rotatably mounted on the other end of said support arm and having an axis of rotation parallel to said vertical axis; a movable secondary support arm pivotally connected at one end thereof to said other end of said support arm so as to pivot about an axis parallel to said vertical axis; a load-bearing support roller rotatably mounted on the other end of said secondary support arm and having an axis of rotation at right angles to said vertical axis, said load-bearing support roller having a grooved periphery; a support track secured inside the vehicle adjacent the upper edge of said defined opening in the vehicle side and extending at least the width of said defined opening, said track having an upstanding portion thereof engaged with the grooved periphery of said load-bearing support roller; and a guide track secured inside said vehicle and above said support track, which guide track extends at a converging angle to said support track for at least the width of said defined opening; said rotatable guide roller being movably retained within said guide track so that, as the sliding door is moved from said first position to said second position, the movement of the guide roller and the load-bearing support roller along the respective tracks thereof causes the upper leading edge of the door to move into sealing engagement with a corresponding upper edge of said defined opening.

3. A motor vehicle having a sliding door assembly including a sliding door and three separate guide means for said sliding door, said sliding door being movable on said three guide means between a first position wherein said sliding door is held suspended parallel to and adjacent a side of said vehicle and a second position wherein said sliding door fills an opening defined in said vehicle side and lies flush with said vehicle side; the first of said guide means being situated at the upper leading edge of the sliding door, the second of said guide means means being situated at the lower leading edge of the sliding door, and the third of said guide means being situated at a point on the trailing edge of the sliding door indermediate the upper and lower edges thereof; said first guide means comprising; a support bracket secured to the sliding door adjacent the upper leading edge thereof; a cranked support arm pivotally mounted at one end to said support bracket and movable relative to said sliding door about a vertical axis extending through said support bracket; a guide roller rotatably mounted on the other end of said support arm and having an axis of rotation parallel to said vertical axis; a movable secondary support arm pivotally connected at one end thereof to said other end of said support arm so as to pivot about an axis parallel to said vertical axis; a load-bearing support roller rotatably mounted on the other end of said secondary support arm and having an axis of rotation at right angles to said vertical axis, said load-bearing support roller having a grooved periphery; a support track secured inside the vehicle adjacent the upper edge of said defined opening in the vehicle side and extending at least the width of said defined opening, said track having an upstanding portion thereof engaged with the grooved periphery of said load-bearing support roller; and a guide track secured inside said vehicle and above said support track, which guide track extends at a converging angle to said support track for at least the width of said defined opening and contains said rotatable guide roller movably retained therein; and said third guide means comprising: a substantially horizontal U-shaped cranked arm pivoted at one end of one limb thereof to the door about a substantially vertical axis; a guide roller rotatably mounted on the other limb of said U-shaped cranked arm and having an axis of rotation parallel to the pivot axis of said U-shaped cranked arm; a load-bearing guide roller rotatably mounted on the other limb of said U-shaped cranked arm and having an axis of rotation at right angles to the pivot axis of said U-shaped cranked arm; and a substantially horizontal guide track extending along the side of the vehicle from a point adjacent both said defined opening and said intermediate point on the trailing edge of the sliding door, said horizontal guide track having a substantially C-shaped cross-section and terminating in a hooked portion extending inwardly of the vehicle at said point adjacent said defined opening; both the guide roller and the load-bearing guide roller mounted on the other limb of said U-shaped cranked arm being movably retained within said horizontal guide track so that, as the sliding door is moved from said first position to said second position, the movement of this guide roller and load-bearing guide roller along the horizontal guide track and around said hooked portion causes the trailing edge of the sliding door to move into sealing engagement with a corresponding side of said defined opening, whilst the movement of the guide roller and the load-bearing support roller of the first guide means in their respective tracks causes the upper leading edge of the door to move into sealing engagement with a corresponding edge of said defined opening.

4. A motor vehicle having a sliding door assembly including a sliding door and three separate guide means for said sliding door, said sliding door being movable on said three guide means between a first position wherein said sliding door is held suspended parallel to and adjacent a side of said vehicle and a second position wherein said sliding door fills an opening defined in said vehicle side and lies flush with said vehicle side; the first of said guide means being situated at the upper leading edge of the sliding door, the second of said guide means being situated at the lower leading edge of the sliding door, and the third of said guide means being situated at a point on the trailing edge of the sliding door intermediate the upper and lower edges thereof; said first guide means comprising: a support bracket secured to the sliding door adjacent the upper leading edge thereof; a cranked support arm pivotally mounted at one end to said support bracket and movable relative to said sliding door about a vertical extending through said support bracket; a guide roller rotatably mounted on the other end of said support arm and having an axis of rotation parallel to said vertical axis; a movable secondary support arm pivotally connected at one end thereof to said other end of said support arm so as to pivot about an axis parallel to said vertical axis; a load-bearing support roller rotatably mounted on the other end of said secondary support arm and having an axis of rotation at right angles to said vertical axis, said load-bearing support roller having a grooved periphery; a support track secured axis extending the vehicle adjacent the upper edge of said defined opening in the vehicle side and extending at least the width of said defined opening, said track having an upstanding portion thereof engaged with the grooved periphery of said load-bearing support roller; and a guide track secured inside said vehicle and above said support track, which guide track extends at a converging angle to said support track for at least the width of said defined opening and containing said rotatable guide roller movably retained therein; said second guide means comprising: a guide arm secured at one end to the lower leading edge of the sliding door, said guide arm extending inwardly of the vehicle from said lower leading edge; a guide roller rotatably mounted on the other end of said guide arm and having a vertical axis of rotation; and a curved channel-shaped guide track extending beneath a floor portion of the vehicle adjacent said defined opening, which channel-shaped track guidingly retains therein the guide roller of the second guide means and is curved in a plane substantially parallel to the plane of said floor portion of the vehicle; and said third guide means comprising a substantially horizontal U-shaped cranked arm pivoted at one end of one limb thereof to the door about a substantially vertical axis; a guide roller rotatably mounted on the other limb of said U-shaped cranked arm and having an axis of rotation parallel to the pivot axis of said U-shaped cranked arm; a load-bearing guide roller rotatably mounted on the other limb of said U-shaped cranked arm and having an axis of rotation at right angles to the pivot axis of said U-shaped cranked arm; and a substantially horizontal guide track extending along the side of the vehicle from a point adjacent both said defined opening and said intermediate point on the trailing edge of the sliding door, said horizontal guide track having a substantially C-shaped cross-section and terminating in a hooked portion extending inwardly of the vehicle at said point adjacent said defined opening both the guide roller and the load-bearing guide roller mounted on the other limb of said U-shaped cranked arm being movably retained within said horizontal guide track so that, as the sliding door is moved from said first position to said second position, the movement of this guide roller and load-bearing guide roller along the horizontal guide track and around said hooked portion causes the trailing edge of the sliding door to move into sealing engagement with a corresponding side of said defined opening, whilst the movement of the guide roller and the load-bearing support roller of the first guide means in their respective tracks causes the upper leading edge of the door to move into sealing engagement with a corresponding edge of said defined opening, and the movement of the guide roller of the second guide means along the curved channel-shaped guide track causes the lower leading edge of the sliding door to move into sealing engagement with a corresponding edge of said defined opening.

* * * * *

UNITED STATES PATENT AND TRADEMARK OFFICE
CERTIFICATE OF CORRECTION

PATENT NO. : 4,157,846
DATED : June 12, 1979
INVENTOR(S) : Alan J. Whitcroft

It is certified that error appears in the above—identified patent and that said Letters Patent are hereby corrected as shown below:

Column 8, line 29, "discribed" should read -- described --.

Column 7, line 25, delete "means" (first occurrence).

Column 7, line 28, "indermediate" should read -- intermediate --.

Signed and Sealed this

Fourth Day of December 1979

[SEAL]

Attest:

Attesting Officer

SIDNEY A. DIAMOND

Commissioner of Patents and Trademarks